(12) United States Patent
McGrath (10) Patent No.: US 9,557,004 B1
(45) Date of Patent: Jan. 31, 2017

(54) ADJUSTABLE BRACKET ASSEMBLY

(71) Applicant: Andrew H. McGrath, Concord, CA (US)

(72) Inventor: Andrew H. McGrath, Concord, CA (US)

( * ) Notice: Subject to any disclaimer, the term of this patent is extended or adjusted under 35 U.S.C. 154(b) by 185 days.

(21) Appl. No.: 14/474,551

(22) Filed: Sep. 2, 2014

(51) Int. Cl.
| | |
|---|---|
| *F21V 33/00* | (2006.01) |
| *F25D 27/00* | (2006.01) |
| *F27D 21/02* | (2006.01) |
| *F16M 13/02* | (2006.01) |
| *A47F 10/06* | (2006.01) |
| *F21V 19/00* | (2006.01) |
| *H05B 3/00* | (2006.01) |

(52) U.S. Cl.
CPC ............. *F16M 13/02* (2013.01); *A47F 10/06* (2013.01); *F21V 19/0075* (2013.01); *H05B 3/0033* (2013.01); *A47B 2220/0036* (2013.01); *A47F 2010/065* (2013.01)

(58) Field of Classification Search
CPC .... F16M 13/02; A47F 10/06; A47F 2010/065; F21V 19/0075; H05B 3/0033; A47B 2220/0036
USPC ........ 362/92, 217.11, 217.15, 217.14, 217.1, 362/152, 145, 249.03, 125
See application file for complete search history.

(56) References Cited

U.S. PATENT DOCUMENTS

| | | | | |
|---|---|---|---|---|
| 5,072,343 | A * | 12/1991 | Buers ...................... | A47F 3/001 312/223.5 |
| 5,690,415 | A * | 11/1997 | Krehl ...................... | A47F 5/101 108/23 |
| 8,002,426 | B2 * | 8/2011 | Pearson .............. | E04F 11/1834 362/146 |
| 8,403,430 | B2 | 3/2013 | Atkins | |
| 2012/0200207 | A1 | 8/2012 | Atkins | |

\* cited by examiner

*Primary Examiner* — Andrew Coughlin
*Assistant Examiner* — Jessica M Apenteng
(74) *Attorney, Agent, or Firm* — Charles L. Thoeming

(57) ABSTRACT

Embodiments of an adjustable panel assembly are disclosed. According to one embodiment, at least one adjustable articulating arm assembly connects a support elements having a plurality of equal sized side apertures to adjustable panel ends, providing an adjustable panel assembly with pivot hinges to rotate the adjustable panel about a common longitudinal axis for paired pivot hinges. Fixed top and side panels may be provided for each pair of corresponding support elements. Adjustable modular lighting and heating elements may be adapted between corresponding support elements to provide light or heat to a surface area below or within the panel assembly. The adjustable panel assembly components can be disassembled and/or collapsed into substantially flat shipping containers for ease of distribution and portability.

23 Claims, 5 Drawing Sheets

ADJUSTABLE BRACKET ASSEMBLY

CROSS-REFERENCES TO RELATED APPLICATIONS

More detailed disclosures of various pivot hinge assemblies corresponding to the disclosed adjustable bracket assembly are provided in co-pending, U.S. Non-provisional Utility patent application Ser. No. 14/264,722, filed Apr. 29, 2014 (the "722 application") which issued on Dec. 2, 2014, as U.S. Pat. No. 8,898,896, Ser. No. 14/307,900, filed Jun. 18, 2014 (the "900 application") which issued on Jun. 23, 2015, as U.S. Pat. No. 9,062,483, and Ser. No. 14/311,941, filed Jun. 23, 2014 (the "941 application") which issued on Jan. 6, 2015, as U.S. Pat. No. 8,925,153, each of which are hereby incorporated in their entirety by reference.

A more detailed disclosure of various articulating arm assemblies corresponding to the disclosed adjustable bracket assembly are provided in co-pending, U.S. Non-provisional Utility patent application Ser. No. 14/322,080, filed Jul. 2, 2014 (the "080 application") which is hereby incorporated in its entirety by reference.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to an adjustable bracket assembly that, for instance, is adaptable to ready-to-assemble components used in adjustable bracket assemblies for adapting to and connecting one or more substantially external support member(s) defined by the particular utility of the overall assembly of at least one fixed support structure, and for providing at least one panel or an adjustable panel assembly to positionally adjust and secure a panel about a central pivot hinge axis orthogonally disposed to the support structure.

BACKGROUND OF THE INVENTION

Portable, adjustable panel assemblies having fixed, adjustable or a combination of fixed and adjustable panels with associated support or bracketing are well known in the art and typically comprise a limited degree of range of motion for at least one supported panel.

Designing and assembling portable, adjustable panel assemblies using these various elements is ordinarily complicated since dimensions, load factors, code requirements, and aesthetics converge to present brackets which are labor and component intensive. Often bracketing assemblies will have many component parts and require several tools for assembly. Moreover, with current technology, bracket assemblies, particularly those providing one of more panel assemblies, require much broader ranges of adaptability than what is provided in the art, and even when a custom design is presented, packaging, shipping, installing, transporting, positioning and using the bracket assemblies are cumbersome and overly time consuming.

Various types of adjustable panel assemblies with adjustable and/or lockable hinges are used for securing bracketing components or bracketing assemblies integrally or to other external structures, and/or immobilizing and/or adjusting one component with respect to another component about a common axis. Many ready to assemble bracket assemblies utilize location dependent uprights or support members that multiply the effort needed to design and assemble the adjustable and lockable hinge assemblies and that intensify the complexity of the process. The ease of shipping, assembling, using, and maintaining these panel assemblies is at best marginal, and can vary considerably between installation environments.

Presently, most adjustable and lockable bracketing assemblies for bracketing are initially assembled or installed by the seller because of the complexity of assembling. Thus, many bracketing assemblies are handled fully or most fully assembled which presents bulky cargo that takes up considerable amount of space and is difficult to transport. These assemblies do not provide any portability or rapid adjustment or operation.

Additionally, when one part of a piece of an adjustable bracket assembly is damaged, often the entire product must be returned instead of simply replacing the damaged part. For example, when a support or pivot element for an upright bracketing assembly fails or is defective, generally the entire bracketing assembly must be disassembled and replaced.

Finally, the adjustable bracket assembly needs to be supported by adequate and aesthetically pleasing attachment components for securing one or more integral hinge elements of the panel assembly to one or more adjustable panel assemblies or portable support structures.

Further, an adjustable bracket assembly should embody adjustable pivot hinges and reversible end panels to allow for easy and quick conversion from a pass-over assembly to a self-serf assembly.

There is, accordingly, a need for a modular adjustable bracket assembly that provides a simple to assemble and adjust support elements with assemblies to adjust at least one panel, and support for at least one fixed panel.

Likewise, there is a need for an adjustable bracket assembly that provides modular attachment capabilities for adjustable lighting and/or adjustable heating fixtures.

Further there is a need for an adjustable bracket assembly that provides modular replacement components for hinge or bracketing elements of the adjustable bracket assembly.

There is also a need for an adjustable bracket assembly that provides adjustable and pivot hinge assemblies that enhance the ease of assembly or installation, rapid adjustment, and ease of operation of the adjustable bracket assembly, and allows for easy component replacement.

A further need exists for adjustable bracket assemblies that in disassemble, manufactured components can be shipped in flattened containers, thus eliminating the need for forklift equipment to receive the boxed assemblies at the end user site.

DISCLOSURE OF INVENTION

Embodiments of the adjustable bracket assembly provide panel support assemblies with extensive adaptability, adjustability and configurability. All embodiments provide adjustable bracket assembly components that pack flat for ease in shipping and portability.

According to one aspect, an adjustable bracket assembly provides at least one support element or post configured to receive up to five adjustable assemblies by a separate support element fitting, each adjustable assembly corresponding to at least one articulating arm having pivot hinge connections to a separate support element fitting and to one end of a separate longitudinally disposed item, with a second end of each longitudinally disposed item similarly arranged to a second support element. At least one of the longitudinally disposed items is a clear panel. The paired support elements are attached or positioned onto a horizontally disposed surface so that the longitudinally disposed items can be independently adjusted in parallel axes to the horizontally disposed surface by at least one articulating arm and a plurality of pivot hinges. In a preferred embodiment, a longitudinally clear panel is adjustable 360 degrees about a longitudinal axis parallel to the horizontally disposed surface and defined by corresponding pivot hinges on either end of the panel.

In certain embodiments, a top panel is affixed to a pair of support elements. In some of these embodiments, the top panel is clear.

In certain embodiments, a top panel is affixed to a pair of support elements and a side panel is affixed to each support element. In some of these embodiments, the top panel is clear. In some of these embodiments, the top and side panels are clear. In some of these embodiments, the side panels are reversible to expand applicable utility to various alternate use environments.

In certain embodiments, another longitudinally disposed item is a modular light bar.

In certain embodiments, another longitudinally disposed item is a modular heat lamp and light.

The pivot hinge elements may include one or more of the features and embodiments disclosed in the 722 application, the 900 application, the 941 application, or the 080 application.

Various aspects and advantages of the adjustable bracket assembly will become apparent from the following detailed description taken in conjunction with the accompanying drawings.

BRIEF DESCRIPTION OF DRAWINGS

Further features and advantages of the adjustable bracket assembly will become apparent from the following detailed description made with reference to the accompanying drawings, in which.

MODES FOR CARRYING OUT THE INVENTION

This detailed description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to various assemblies using the adjustable bracket assembly for securing panel components in a variety of configurations or required positions for the use of the panel assembly as may be desired using bracketing components or bracketing assemblies integrally or to other external structures, and/or immobilizing and/or adjusting one component with respect to another component about a common axis, the exemplary features and embodiments of the present application may additionally or alternatively be applied to other types of portable, adjustable panel assemblies having pivot hinge components, including, for example, various types of portable screens, panel bracketing, extending support hinges, folding hinges, rotisserie assemblies, displayed food guards or sneeze guards, frame hinges, hinges that permanently attach, releasably attach, and/or remain detached from a bracketing assembly, or any other assembly providing one or more paired panel components to be rotated and secured between two support elements, one relative to the other, and other types of uses, for example, with other portable items, such as, without limitation, sneeze guard assemblies, screens, tables, beds, panel stands, lecterns, carrying racks, cabinetry, storage racks, or furniture.

Further, persons with skill in the art understand that the terms "press fit" and "interference fit" are synonymous terms for a fit wherein one of the mating parts of an assembly is forced into a space provided by the other part in such a way that the condition of maximum metal overlap is achieved.

As depicted in FIGS. 1-17 embodiments of an adjustable bracket assembly 10 for mounting at least one panel in a food shield and/or modular lighting and/or heating units over a planar surface are disclosed. However, those skilled in the art will readily appreciate that the detailed description given herein with respect to these figures is for explanatory purposes as the adjustable bracket assembly extends beyond these limited embodiments.

An embodiment of adjustable bracket assembly 10 includes at least two support elements 20. Each support element 20 provides (i) a support element 20 planar base surface; (ii) a support element 20 planar top surface; (iii) a support element 20 concave front surface; (iv) a support element 20 convex back surface; (v) equal sized support element 20 planar internal side and external side surfaces within the support element 20 base surface, top surface, front surface, and back surface, the support element 20 side surfaces widening at the orthogonal intersections of the support element 20 base surface and the support element 20 top surface; and (vi) a plurality of equal sized apertures 26 equally disposed along the support element 20 internal side and external side surfaces, FIGS. 1-8, 15-17.

At least two articulating arm assemblies are provided in the adjustable bracket assembly 10, each articulating arm assembly providing at least one articulating arm 60 having integral pivot hinge 100 ends, FIGS. 1-4, 9, 15 and 16. One articulating arm 60 first pivot hinge end is affixed to a corresponding aperture in each support element 20 such that each articulating arm 60 is deployed on its respective support element 20 internal side surface. A articulating arm 60 second pivot hinge 100 end is affixed by an attachment assembly to a common adjustable panel 200 defining a common longitudinal axis 92 between corresponding articulating arm 60 second pivot hinge 100 ends, FIGS. 1-4, 9, 15. The attachment assembly has 360 degree rotational adjustment about the common longitudinal axis 92 between corresponding articulating arm 60 second pivot hinge 100 ends and between the at least two support elements 20. The adjustable panel 200 has rotational adjustment about the common longitudinal axis 92. Each pivot hinge 100 is interference fitted into the corresponding articulating arm 60 end, and into the adjustable panel 200 attachment assembly. A preferred embodiment of articulating arm 60 is ½ inch thick. Features of the articulating arm are also disclosed in the 080 application.

An embodiment of adjustable bracket assembly 10 further includes a side panel 400 fixedly attached to each support element 20 external side surface. Attachment of the side panel 400 to the support element 20 external side surface for a preferred embodiment of adjustable bracket assembly 10 includes at least one threaded fastener sized to fit through the at least one side panel 400 aperture and to be received and held by the at least one support element 20 external side surface threaded aperture FIGS. 1-4, and 9. It will be understood by persons with skill in the art that the side panels 400 can vary dimensionally and geometrically. Further, the side panels 400 can be affixed in reverse orientation for alternative utility in differing adjustable bracket assembly 10 environments, see, e.g., FIGS. 1 and 3 versus FIGS. 2 and 4.

An embodiment of adjustable bracket assembly 10 includes an attachment assembly to fixedly attach to and secure a top panel 300 to the adjustable bracket assembly 10, FIGS. 1-9.

Figures 1, 2, 3, 4:
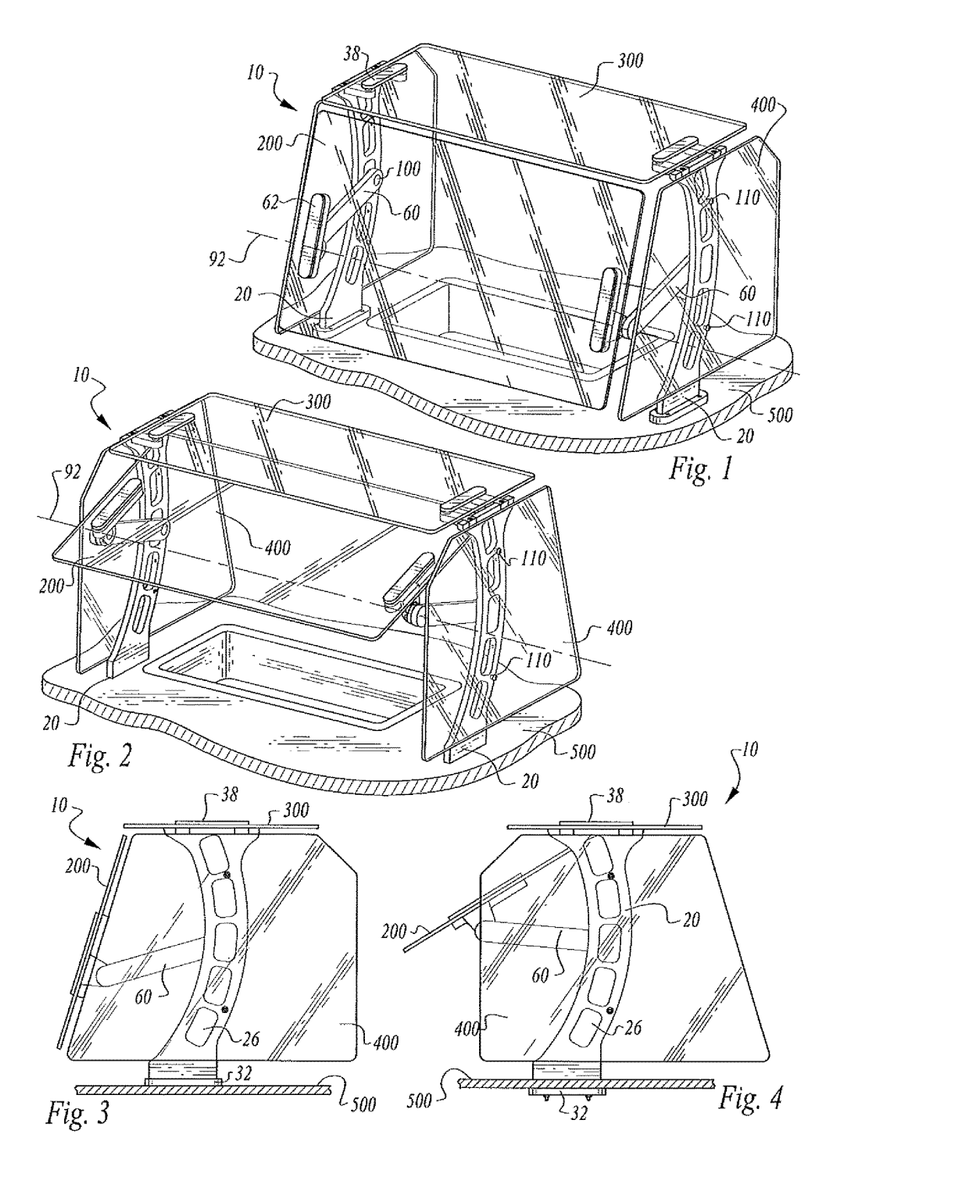
FIG. 1 is a top right front perspective view of an embodiment of an adjustable bracket assembly 10 that includes two bracket support elements 20, a fixed top panel 300 attached to the top side of each support element 20, and fixed side panels 400 attached to the exterior surfaces of two bracket support elements 20, an adjustable articulating arm 60 affixed to each bracket support element 20 interior surface and an adjustable panel 200 with an adjustable pivot range of motion about the longitudinal axis 92 of one pair of opposing pivot hinges in the adjustable articulating arm, in one of many possible configurations of the adjustable bracket assembly 10.
FIG. 2 is a top right front perspective view of an embodiment of an adjustable bracket assembly 10 that includes two bracket support elements 20, a fixed top panel 300 attached to the top side of each support element 20, and fixed side panels 400, in a reversed orientation from the side panel position of the embodiment of adjustable bracket assembly 10 of FIG. 1, attached to the exterior surfaces of two bracket support elements 20, an adjustable articulating arm 60 affixed to each bracket support element 20 interior surface and an adjustable panel 200 with an adjustable pivot range of motion about the longitudinal axis 92 of one pair of opposing pivot hinges in the adjustable articulating arm, in another of many possible configurations of the adjustable bracket assembly 10.
FIG. 3 is an orthogonal right side view of the embodiment of the adjustable bracket assembly 10 of FIG. 1, and further depicting a possible attachment configuration of the adjustable bracket assembly 10 to a base 32 plate attached to and above the horizontally disposed planar surface 500.
FIG. 4 is an orthogonal right side view of the embodiment of the adjustable bracket assembly 10 of FIG. 2, and further depicting a possible attachment configuration of the adjustable bracket assembly 10 to the horizontally disposed planar surface 500 and base 32 plate below the horizontally disposed planar surface 500.
Figures 5, 6:
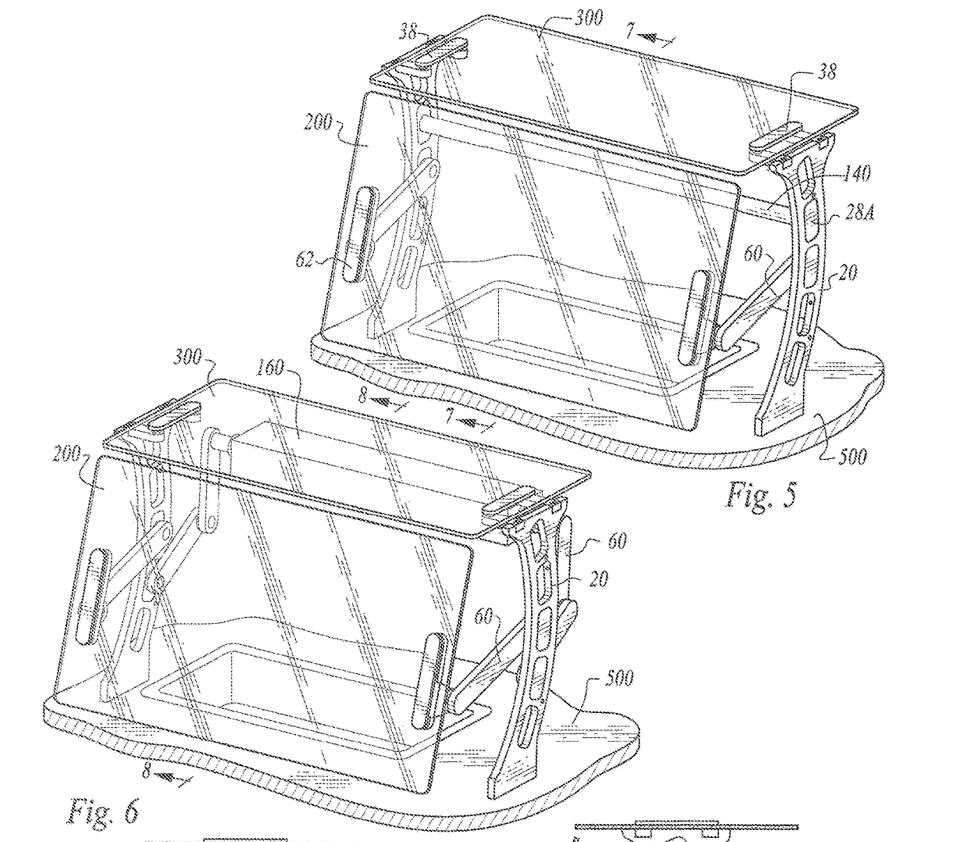
FIG. 5 is a top right front perspective view of an embodiment of the adjustable bracket assembly 10, having an adjustable panel 200 and a fixed top panel 300, and depicting a modular, adjustable light bar 140 affixed to the inside surfaces of two bracket support elements 20.
FIG. 6 is a top right front perspective view of an embodiment of the adjustable bracket assembly 10, having an adjustable panel 200 and a fixed top panel 300, depicting a modular, adjustable heat lamp and light 160 affixed to the inside surfaces of two bracket support elements 20.
Figure 7:
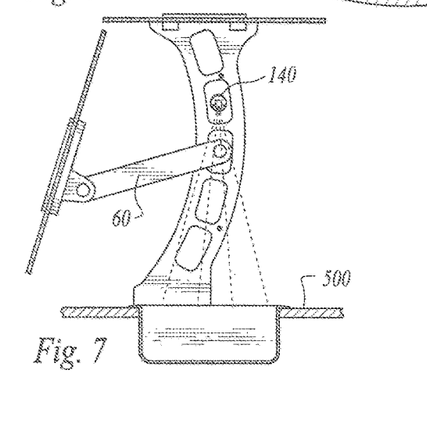
FIG. 7 is an orthogonal cross-sectional view of the embodiment of the adjustable bracket assembly 10 of FIG. 5 taken at "7-7".
Figure 8:
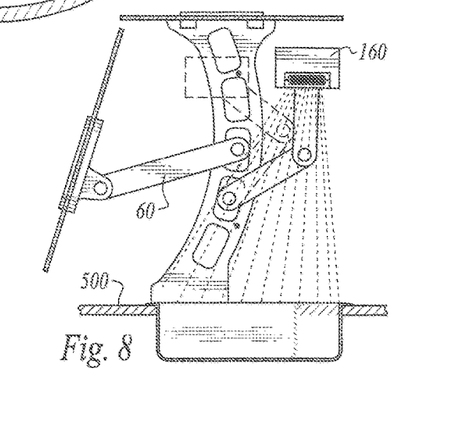
FIG. 8 is an orthogonal cross-sectional view of the embodiment of the adjustable bracket assembly 10 of FIG. 6 taken at "8-8".
Figures 9, 10:
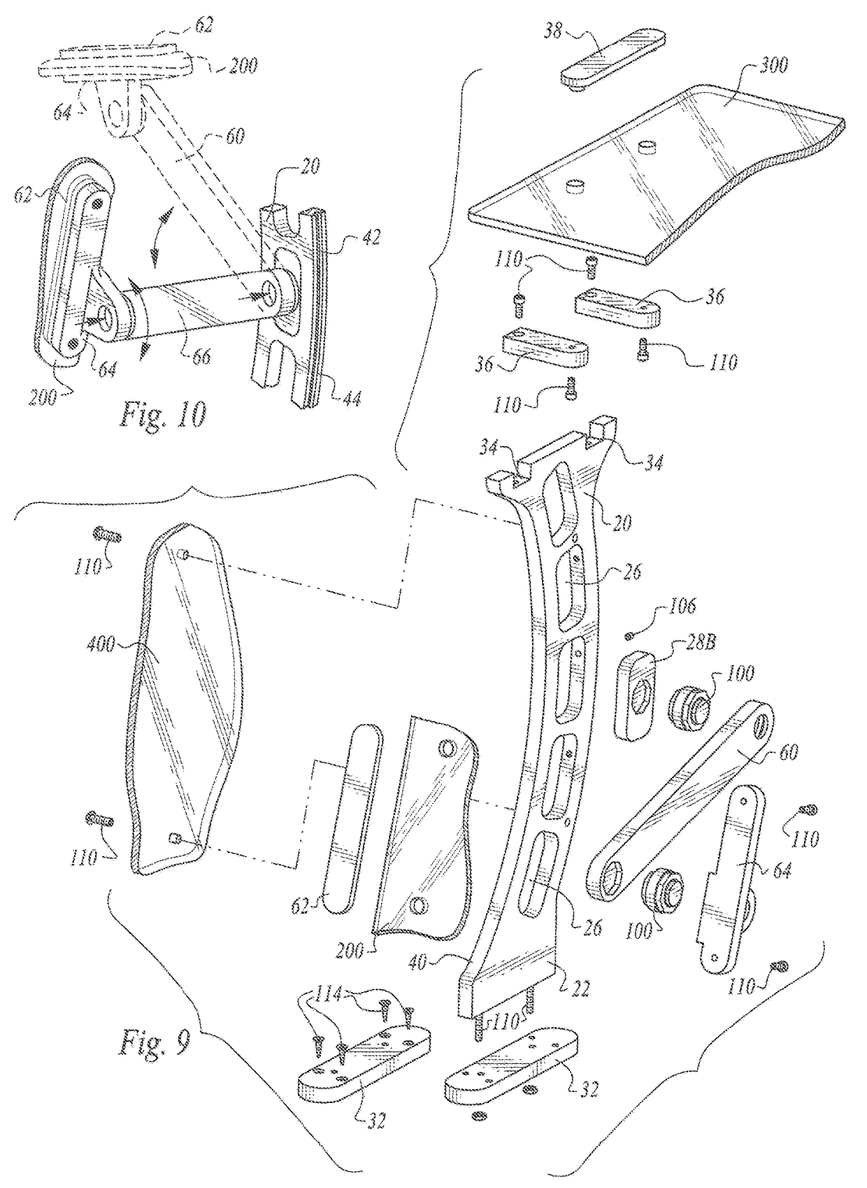
FIG. 9 is an exploded detailed top left front perspective view of the embodiment of the adjustable bracket assembly 10 of FIG. 1 or 2, 10 that includes, among other detailed element features, the left side bracket support element 20 internal surface, adjustable panel 200, fixed top panel 300 side panel 400, and alternative support element base attachment assemblies.
FIG. 10 is a partial top right rear detailed perspective view of embodiments of the adjustable bracket assembly 10, providing alternative variable adjustable panel 200 configurations with respect to the panel bracket support element 20 internal surface.

Attachment of a common top panel 300 to support elements 20 top surfaces for a preferred embodiment of adjustable bracket assembly 10 includes two equal sized channels 34 in each support element top surface, each channel 34 arranged at an equal distance from a corresponding top surface end, FIG. 9. A fitting 36 sized to be received and secured by at least one threaded fastener 110 corresponding to a threaded aperture in each support element 20 top surface channel 34 such that a first fitting end is flush with the support element 20 external surface and a second fitting end extends beyond the support element 20 internal surface for an internal fitting length, whereby all internal fitting lengths are equal, and a fitting 36 top surface is flush with the support element 20 top surface, FIGS. 5, 6, 11-13. A cap 38 comprising two threaded apertures, each sized to receive at least one threaded fastener 110 through an aperture in each second fitting 36 end and top panel 300, thus fixedly secures the top panel 300 to each flush mounted fitting in the support element 20 top surface, FIGS. 5, 6, 11-13.

An embodiment of adjustable bracket assembly 10 includes at least two threaded apertures in each support element 20 planar base bottom surface, each aperture sized to receive a threaded fastener 110 received through an aperture through a horizontally disposed planar surface 500 whereby the adjustable bracket assembly base bottom surface is affixed to a base plate 32 below the horizontally disposed planar surface 500. Accordingly, an embodiment of adjustable bracket assembly 10 provides paired support element 20 bases attached to the horizontally disposed planar surface 500, FIGS. 4, 9, and further provides the connecting base plate 32 for each support element 20 base under the planar surface 500.

An embodiment of adjustable bracket assembly 10 includes a base plate 32 that is affixed to the horizontally disposed planar surface 500 by at least one threaded base plate fastener 114. In such a configuration the support element 20 planar base bottom surface is affixed to the base plate 32 by at least one threaded fastener 110, FIGS. 3, 9. Accordingly, an embodiment of adjustable bracket assembly 10 provides paired support element 20 bases attached to the horizontally disposed planar surface 500, FIGS. 3, 9, and further provides the connecting base plate 32 for each support element 20 base on the planar surface 500.

An embodiment of adjustable bracket assembly 10 includes a modular, adjustable light bar assembly. A preferred embodiment of adjustable bracket assembly 10 provides a light bar 140 that includes two ends, with a power cord 142 on one end. A light bar fitting 28A having a length, width, thickness, and internal face sized to adjustably receive a light bar 140 end, allows the light bar fitting 28A to be received by a corresponding internal side aperture 26 in each support element 20 and fixed thereto by a set screw 106 through a threaded aperture in a channel 44 on the support element 40 convex back surface such that the light bar fitting 28A is flush with the support element 20 internal side and support element 20 external side surfaces, FIGS. 5, 7, 11 and 12. In this manner, the light bar 140 is horizontally disposed between the paired support elements 20. The support element 20 convex back surface channel 44 is sized to receive the light bar 140 power cord 142 along the support element 20 convex back surface to a power source on or below a horizontally disposed planar surface 500 supporting the adjustable bracket assembly 10. The light bar 140 is rotatably adjustable between the light bar fittings 28A to direct light onto a desired portion of the horizontally disposed planar surface 500. A preferred embodiment of light bar assembly uses 1' diameter aluminum tubing matching a #4 brushed aluminum finish, with a plurality of 0.3 Amp-0.9 Amp light emitting diode (LED) bulbs aligned linearly lengthwise along the modular, adjustable light bar 140, with a 12 V UL listed power source.

An embodiment of adjustable bracket assembly 10 provides a articulating arm 60 assembly that includes a articulating arm fitting 28B comprising a length, width, thickness, and internal face aperture sized to adjustably receive and hold a pivot hinge 100 corresponding to the articulating arm 60 first pivot hinge end, whereby the articulating arm fitting 28B length, width, and thickness allow the articulating arm fitting 28B to be received by a corresponding support element 20 internal side aperture 30 and fixed thereto by a set screw 106 through a threaded aperture in the channel 44 on the support element 20 convex back surface 42 such that the articulating arm fitting 28B is flush with the support element 20 internal side and support element 20 external side surface and an actuating end for the pivot hinge 100 corresponding to the articulating arm 60 first end or fitting 28B is accessible from the support element 20 internal side surface, FIGS. 9-12. The articulating arm 60 second pivot hinge 100 end attachment assembly includes (i) a panel attachment fitting comprising an aperture sized to receive and hold a pivot hinge 100 corresponding to the articulating arm 60 second end such that any actuating end for the pivot hinge 100 corresponding to the articulating arm 60 second end is accessible from the support element 20 internal side surface, and two threaded apertures in a panel attachment fitting planar surface 64, each threaded aperture equal distance from a corresponding panel attachment fitting planar surface 64 end, (ii) a cap 62 comprising two threaded apertures sized to correspond to the threaded apertures in the panel attachment fitting planar surface 64 and to receive a threaded fastener 110 through the apertures in each panel attachment fitting planar surface 64 and the adjustable panel 200, thus fixedly securing the adjustable panel 200 under the cap 62 and to the panel attachment fitting planar surface 64, and (iii) two threaded fasteners 110 sized to be received in the panel attachment fitting planar surface 64 and cap 62 threaded apertures. Each pivot hinge 100 is interference fitted into the corresponding articulating arm 60 end, and into the articulating arm fitting 28B.

Figures 11, 12, 13, 14:
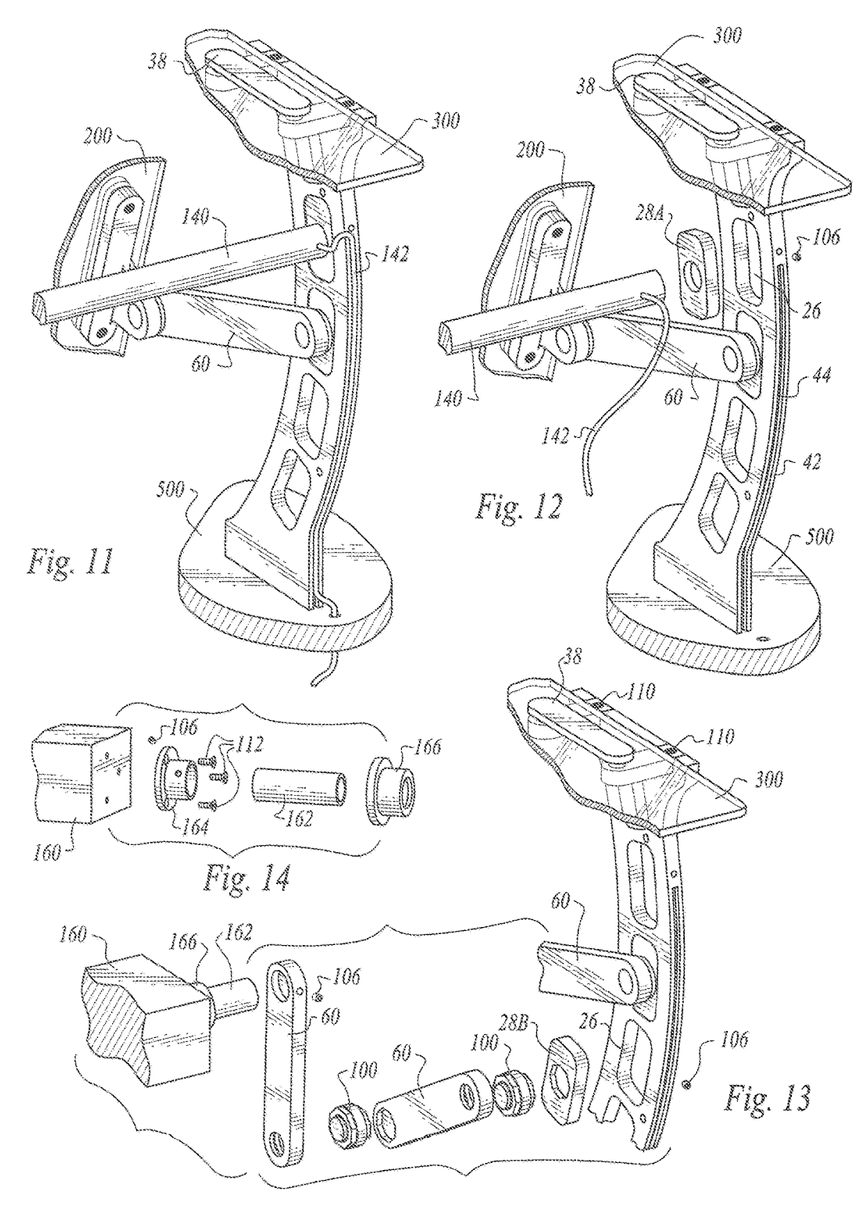
FIG. 11 is a top left rear perspective view of an embodiment of the adjustable bracket assembly 10 with the adjustable panel 200 and fixed top panel 300 of FIG. 5, depicting one end of a modular, adjustable light bar 140 affixed to a bracket support element 20 inside surface.
FIG. 12 is an exploded detail view of the embodiment of the adjustable bracket assembly 10 with the adjustable panel 200, fixed top panel 300, and one end of a modular, adjustable light bar 140 to be affixed to a bracket support element 20 of FIG. 11.
FIG. 13 is a detailed exploded top left rear perspective view of the embodiment of adjustable bracket assembly 10 providing fixed top panel 300, a portion of hinge arm 60 attached to the adjustable panel (not shown), and the modular, adjustable heat lamp and light 160 of FIG. 6 to be affixed to the right bracket support element 20 inside surface by alternate adjustable articulating arm assemblies.
FIG. 14 is a detailed exploded view of the heat lamp and light extension assembly for the modular, adjustable heat lamp and light 160 of FIG. 13 to adjustably attach to the alternate adjustable articulating arm assemblies for an embodiment of adjustable bracket assembly 10.

An embodiment of adjustable bracket assembly 10 provides a modular, adjustable heat lamp and light 160 assembly that includes a longitudinally disposed heat lamp and light 160 comprising two ends, each heat lamp and light 160 end comprising an adjustable heat lamp and light extension assembly, FIG. 14. Two heat lamp and light articulating arm assemblies are affixed, each to one adjustable heat lamp and light extension assembly, FIG. 13, whereby each heat lamp and light articulating arm assembly provides: (i) a first heat lamp and light 160 fitting 28B including a length, width, thickness, and internal face sized to adjustably receive a pivot hinge 100, whereby the first heat lamp and light 160 fitting 28B length, width, and thickness allow the first heat lamp and light 160 fitting 28B to be received by a corresponding internal side aperture in each support element 20 and fixed thereto by a set screw 106 through a threaded aperture in a channel 44 on the support element 20 convex back surface 42 such that the first heat lamp and light 160 fitting 28B is flush with the support element 20 internal side and support element 20 external side surface; (ii) a first heat lamp and light 160 articulating arm 60 comprising two arm ends, a first heat lamp and light 160 articulating arm 60 first end comprising an aperture sized to receive and hold the first heat lamp and light 160 fitting 28B pivot hinge 100, and a first heat lamp and light 160 articulating arm 60 second end comprising an aperture sized to receive and hold a pivot hinge 100; and (iii) a second heat lamp and light 160 articulating arm 60 comprising two arm ends, a second heat 160 lamp articulating arm 60 first end comprising an aperture sized to receive and hold the pivot hinge 100 corresponding to the first heat lamp and light 160 hinged 60 arm second end, and a second heat lamp and light 160 articulating arm 60 second end comprising an aperture sized to receive and hold an adjustable heat lamp and light extension assembly affixed to one heat lamp and light end, FIGS. 13, 14.

Thus configured with articulating arm 60 assemblies on each heat lamp and light 160 end, the heat lamp and light is capable of being horizontally disposed and rotatably adjustable by the at least two heat lamp and light articulating arm assemblies between corresponding support elements 20 to direct heat onto a desired portion of the horizontally disposed surface 500. Each pivot hinge 100 is interference fitted into the corresponding articulating arm 60 end, and into the first heat lamp and light fitting 28B such that any pivot hinge actuating end is accessible from the support element 20 inside surface. Aspects of corresponding articulating arms 60 and pivot hinges 100 are also disclosed in the 080 application.

An embodiment of adjustable bracket assembly 10 provides a modular, adjustable heat lamp and light extension assembly that includes two equal-sized cylinders 162, each cylinder including two ends, equal-sized base flanges 164, each base flange 164 including an open end and a base end, wherein a base flange base 164 end is affixed to one heat lamp and light 160 end by a plurality of threaded fasteners 112, and a second base flange 164 base end is affixed to the other heat lamp and light 160 end by a plurality of threaded fasteners 114, and each base flange open end is sized to receive and adjustably hold a cylinder 162 end, FIGS. 13, 14. Two equal-sized cover flanges 166 are included in the adjustable heat lamp and light extension assembly, each second cover flange 166 providing a cover flange 166 open end and a cover flange 166 base end, wherein each cover flange 166 open base end is sized to receive and lock onto a base flange 164 base end by engaging a set screw 106 extension within a channel inside cover flange 166 base end and each cover flange 166 open end is sized to receive and adjustably hold a the cylinder 162 secured by set screw 106. The cylinder 162 end not engaged with the base flange 164 and cover flange 166 assembly is sized to be adjustably received in the second heat lamp and light articulating arm second end aperture, FIGS. 13, 14, and held within the arm's second end aperture by a set screw 106. Embodiments of the heat lamp and light range from 110 Volts, 500 Watts-110 V, 1725 Watts, and are available in one foot increments. Heat lamp and light power supply wiring and controls are matters of local code restrictions and would be so determined and provided by the user upon installation. It will be understood by persons having skill in the art that the heat lamp and light assembly heating function could be adequately achieved by a modular heat lamp only, since not all heat lamps include a light.

While panels 200, 300 and 400 illustrated in FIGS. 1-14 are substantially planar, this is not a requirement. For use of an adjustable bracket assembly 10 to protect displayed food, as in sneeze guard applications, panels 200, 300 and 400 are transparent and are fabricated from Plexiglas, glass, tempered glass, reinforced glass, and the like. An embodiment of an adjustable bracket assembly 10 for mounting at least one panel in a food shield over a planar surface includes ⅜ inch thick, tempered polished glass with ¾ inch radius corners for the adjustable panel 200, and fixed side panels 300 and top panel 400. Alternated embodiments substitute Plexiglas for the fixed side panels 300 and/or top panel 400.

Pivot hinges 100 are more fully described and disclosed according to the 722 application, the 900 application, or the 941 application, depending on the particular adaptation of adjustable bracket assembly 10 to a desired environment. Each pivot hinge 100 includes a longitudinal axis and serves as a pivot point allowing free or adjustable 360 rotation by an attached element in a plane orthogonal to the pivot hinge 100 longitudinal axis. The pivot hinge 100 may be locking or free-wheeling, depending upon the installation requirements. While preferred embodiments of various configurations of the adjustable bracket assembly 10, provide access to the actuating ends of any pivot hinge 100 from the inside surfaces of the support elements 20, (e.g., FIG. 10), it will be understood by persons with skill in the art that alternate embodiments may include some pivot hinge 100 actuating ends accessible from or disposed towards exterior surfaces of the support elements 20, depending on the installation requirements.

Support element 20, fittings 28A and 28B, base plate 32, articulating arm 60, set screws 106, fasteners 110, 112, and 114, heat lamp and light extension cylinder 162, heat lamp and light extension base flange 164, and heat lamp and light extension cover flange 164 can be can be manufactured from brushed aluminum, high strength carbon-composites, steel, stainless steel, and any similar light weight, high strength metal alloys. A preferred embodiment of an adjustable bracket assembly 10 for mounting at least one panel in a food shield over a planar surface includes support elements 20, fittings 28A and 28B, base plate 32, articulating arms 60, heat lamp and light extension cylinder 162, heat lamp and light extension base flange 164, and heat lamp and light extension cover flange 164 manufactured from ½ inch #4 brushed aluminum bar.

Figures 15, 16, 17:
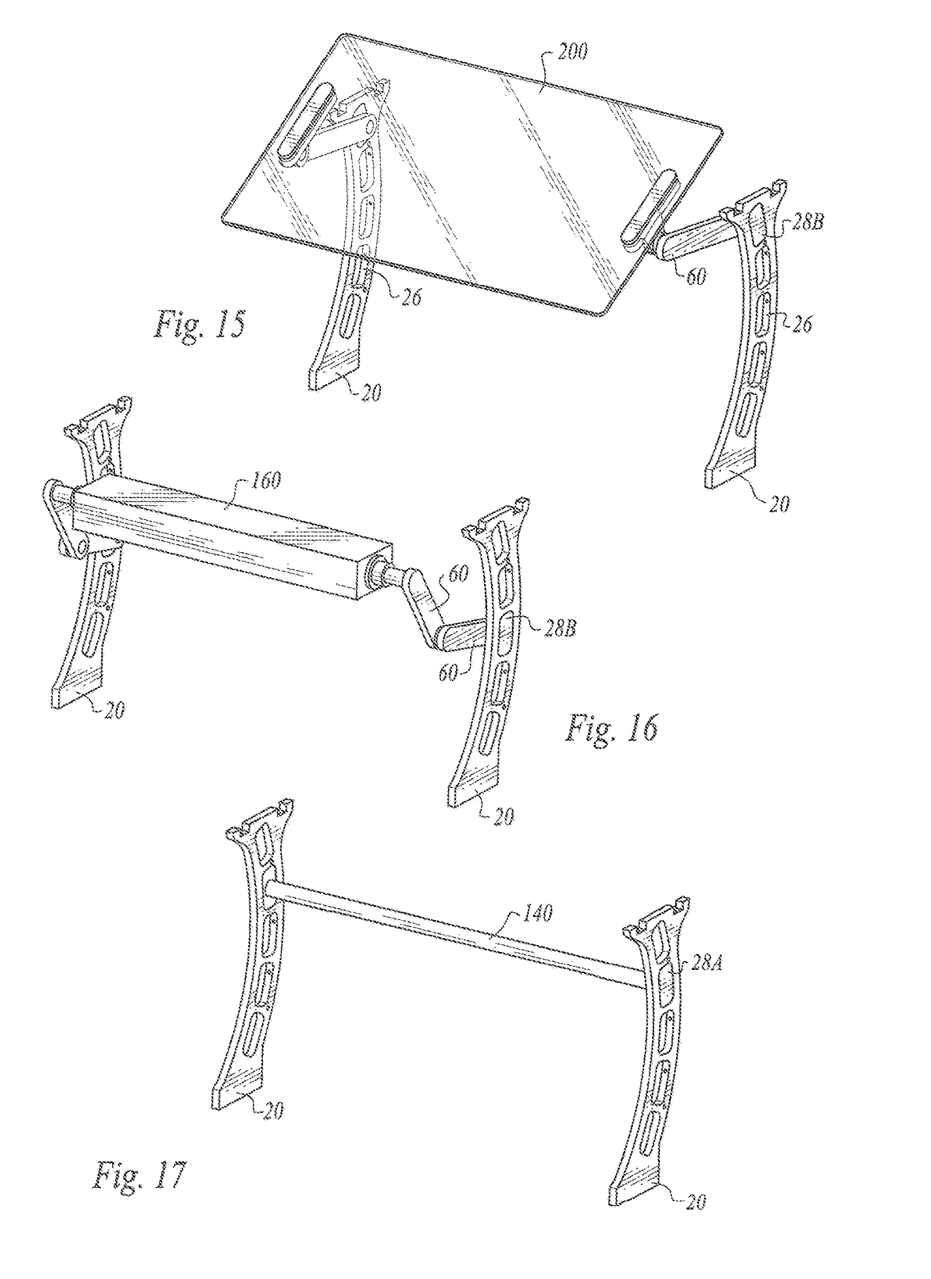
FIG. 15 is a top right front perspective view of an embodiment of an adjustable bracket assembly 10 that includes two bracket support elements 20, an adjustable articulating arm 60 affixed to each bracket support element 20 interior surface and an adjustable panel 200 with an adjustable pivot range of motion about the longitudinal axis of one pair of opposing pivot hinges in the adjustable articulating arm, in one of many possible configurations of the adjustable bracket assembly 10.
FIG. 16 is a top right front perspective view of an embodiment of an adjustable bracket assembly 10 that includes two bracket support elements 20, an adjustable articulating arm 60 assembly affixed to each bracket support element 20 interior surface and a modular, adjustable heat lamp and light 160 affixed to the bracket support element 20 inside surfaces by adjustable articulating arm 60 assemblies.
FIG. 17 is a top right front perspective view of an embodiment of an adjustable bracket assembly 10 that includes two bracket support elements 20 and a modular, adjustable light bar 140 affixed to a bracket support element 20 inside surfaces.

The various aspects, embodiments, implementations or features of the adjustable bracket assembly can be used separately or in any combination. For example, without limitation, FIG. 15 depicts a top right front perspective view of an embodiment of an adjustable bracket assembly 10 that includes two bracket support elements 20, an adjustable articulating arm 60 affixed to each bracket support element 20 interior surface and an adjustable panel 200 with an adjustable pivot range of motion about the longitudinal axis 92 of one pair of opposing pivot hinges in the adjustable articulating arm, in one of many possible configurations of the adjustable bracket assembly 10. Alternatively, FIG. 16 depicts a top right front perspective view of an embodiment of an adjustable bracket assembly 10 that includes two bracket support elements 20, an adjustable articulating arm 60 assembly affixed to each bracket support element 20 interior surface and a modular, adjustable heat lamp and light 160 affixed to the bracket support element 20 inside surfaces by adjustable articulating arm 60 assemblies. And FIG. 17 depicts a top right front perspective view of an embodiment of an adjustable bracket assembly 10 that includes two bracket support elements 20 and a modular, adjustable light bar 140 affixed to a bracket support element 20 inside surfaces. All of the embodiments of the adjustable bracket assembly 10 depicted in FIGS. 15-17 can be affixed to a horizontally disposed planar surface 500 by the attachment assembly options detailed in FIGS. 3, 4 and 9.

The advantages of the adjustable bracket assembly are numerous. Different embodiments or implementations may, but need not, yield one or more of the following advantages. One advantage of certain embodiments of the adjustable bracket assembly is that a wide array of adjustable and fixed panel support assemblies can serve to extend or augment capabilities of an adjustable bracket assembly. Another advantage of certain embodiments of the adjustable bracket assembly is that modular lighting and heating fixtures can be simply implemented and adjustably secured to corresponding support elements of the bracket assembly. Further, all of the assembly components can be packed in flat shipping cartons.

The many features and advantages of the disclosed adjustable bracket assembly are apparent from the written description. Further, since numerous modifications and changes will readily occur to those skilled in the art, the adjustable bracket assembly should not be limited to the exact construction and operation as illustrated and described. Hence, all suitable modifications and equivalents may be resorted to as falling within the scope of the adjustable bracket assembly.

I claim:

1. An adjustable bracket assembly for mounting at least one panel in a food shield over a horizontally disposed planar surface, the adjustable bracket assembly comprising, in combination:
   a) at least two support elements, each support element integrally comprising (i) a planar base surface; (ii) a planar top surface; (iii) a concave front surface; (iv) a convex back surface; (v) equal sized planar internal side and external side surfaces within the base surface, top surface, front surface, and back surface, the side surfaces widening at an orthogonal intersection of the planar base surface and the side surfaces, and at an orthogonal intersection of the planar top surface and the side surfaces; and (vi) a plurality of equal sized apertures equally disposed along the internal side and external side surfaces; and
   b) at least two articulating arm assemblies, each articulating arm assembly comprising at least one articulating arm comprising integral pivot hinge ends, whereby at least one articulating arm first pivot hinge end is affixed to a corresponding aperture in each support element such that each articulating arm is deployed on its respective support element internal side surface, and an articulating arm second pivot hinge end is affixed by an attachment assembly to a common adjustable panel defining a common longitudinal axis between corresponding articulating arm second pivot hinge ends, whereby the panel has rotational adjustment about the common longitudinal axis between corresponding articulating arm second pivot hinge ends and between the at least two support elements.

2. The adjustable bracket assembly for mounting at least one panel in a food shield of claim 1, the adjustable bracket assembly further comprising a side panel fixedly attached to each support element external side surface by at least one threaded fastener sized to fit through at least one side panel aperture and to be received and held by at least one support element external side surface threaded aperture.

3. The adjustable bracket assembly for mounting at least one panel in a food shield of claim 1, wherein each support element top side further comprises an attachment assembly to fixedly attach to and secure a common top panel to the adjustable bracket assembly.

4. The adjustable bracket assembly for mounting at least one panel in a food shield of claim 3, whereby the attachment assembly to fixedly attach to and secure the common top panel to the adjustable bracket assembly comprises, in combination:
   a) two equal sized channels in each support element top surface, each channel at an equal distance from a corresponding top surface end;
   b) a fitting sized to be received and secured by at least one threaded fastener corresponding to a threaded aperture in each top surface channel such that a first fitting end is flush with the support element external surface and a second fitting end extends beyond the support element internal surface for an internal fitting length, whereby all internal fitting lengths are equal, and a fitting top surface is flush with the support element top surface; and
   c) a cap comprising two threaded apertures sized to receive at least one threaded fastener through an aperture in each second fitting end and top panel, thus fixedly securing the top panel to each flush mounted fitting in the support element top surface.

5. The adjustable bracket assembly for mounting at least one panel in a food shield of claim 1, further comprising at least two threaded apertures in a support element planar base surface bottom, each aperture sized to receive a threaded fastener received through an aperture through a horizontally disposed planar surface whereby the adjustable bracket assembly support element planar base surface bottom is affixed to a base plate below the horizontally disposed planar surface, whereby paired support element planar base surface bottoms are supported by the horizontally disposed planar surface and connected base plate for each support element under the horizontally disposed surface.

6. The adjustable bracket assembly for mounting at least one panel in a food shield of claim 1, further comprising a base plate affixed on top of a horizontally disposed planar surface by at least one threaded base plate fastener, and a support element planar base surface bottom affixed to the base plate by at least one threaded fastener, whereby paired support element base surface bottoms are supported and attached to the horizontally disposed planar surface top by the base plate for each support element planar base surface bottom attached to cop of the horizontally disposed planar surface.

7. The adjustable bracket assembly for mounting at least one panel in a food shield of claim 1, further comprising a modular adjustable light bar assembly.

8. The adjustable bracket assembly for mounting at least one panel in a food shield of claim 7, wherein the modular adjustable light bar assembly comprises:
   a) a light bar comprising two ends, with a power cord on one end;
   b) a light bar fitting comprising a length, width, thickness, and internal face sized to adjustably receive a light bar end, whereby the light bar fitting length, width, and thickness allow the light bar fitting to be received by a corresponding internal side aperture in each support element and fixed thereto by a set screw through a threaded aperture in a channel on the support element convex back surface such that the light bar fitting is flush with the support element internal side and external side surfaces with the light bar horizontally disposed between the support elements, whereby the support element convex back surface channel is sized to receive the power cord along the support element convex back surface to a power source on or below a horizontally disposed planar surface supporting the adjustable bracket assembly, and the light bar is rotatably adjustable between the light bar fittings to direct light onto a desired portion of the horizontally disposed planar surface.

9. The adjustable bracket assembly for mounting at least one panel in a food shield of claim 1, wherein:
   a) each articulating arm assembly further comprises an articulating arm fitting comprising a length, width, thickness, and internal face aperture sized to adjustably receive and hold a pivot hinge corresponding to the articulating arm first pivot hinge end, whereby the articulating arm fitting length, width, and thickness allow the articulating arm fitting to be received by a corresponding internal side aperture in each support element and fixed thereto by a set screw through a threaded aperture in a channel on the support element convex back surface such that the articulating arm fitting is flush with the support element internal side and external side surfaces and an actuating end for the pivot hinge corresponding to the articulating arm first end is accessible from the support element internal side surface; and b) the articulating arm second pivot hinge end attachment assembly comprises (i) a panel attachment fitting comprising an aperture sized to receive and hold a pivot hinge corresponding to the articulating arm second end such that any actuating element for the pivot hinge corresponding to the articulating arm second end is accessible from the support element internal side surface, and two threaded apertures in a panel attachment fitting planar surface, each threaded aperture equal distance from a corresponding panel attachment fitting planar surface end, (ii) a cap comprising two threaded apertures sized to correspond to the threaded apertures in the panel attachment fitting planar surface and to receive a threaded fastener through the apertures in each panel attachment fitting planar surface and the adjustable panel, thus fixedly securing the adjustable panel under the cap and to the panel attachment fitting, and (iii) two threaded fasteners sized to be received in the panel attachment fitting threaded apertures.

10. The adjustable bracket assembly for mounting at least one panel in a food shield of claim 1, further comprising a modular adjustable heat lamp and light assembly.

11. The adjustable bracket assembly for mounting at least one panel in a food shield of claim 10, wherein the modular adjustable heat lamp and light assembly comprises:

a) a longitudinally disposed heat lamp and light comprising two ends, each heat lamp and light end comprising an adjustable heat lamp and light extension assembly; and b) at least two heat lamp and light articulating arm assemblies, each assembly comprising: (i) a first heat lamp and light fitting comprising a length, width, thickness, and internal face sized to adjustably receive a pivot hinge, whereby the first heat lamp and light fitting length, width, and thickness allow the heat lamp and light fitting to be received by a corresponding internal side aperture in each support element and fixed thereto by a set screw through a threaded aperture in a channel on the support element convex back surface such that the first heat lamp and light fitting is flush with the support element internal side and external side surfaces; (ii) a first heat lamp and light articulating arm comprising two arm ends, a first heat lamp and light articulating arm first end comprising an aperture sized to receive and hold the first lamp fitting pivot hinge, and a first heat lamp and light articulating arm second end comprising an aperture sized to receive and hold a pivot hinge; and (iii) a second heat lamp and light articulating arm comprising two arm ends, a second heat lamp and light articulating arm first end comprising an aperture sized to receive and hold the pivot hinge corresponding to the first heat lamp and light articulating arm second end, and a second heat lamp and light articulating arm second end comprising an aperture sized to receive and hold the adjustable heat lamp and light extension assembly affixed to each heat lamp and light end;

whereby the heat lamp and light is horizontally disposed and rotatably adjustable by the at least two heat lamp and light articulating arm assemblies between the support elements to direct heat onto a desired portion of the horizontally disposed planar surface.

12. The adjustable bracket assembly for mounting at least one panel in a food shield of claim 11, wherein the adjustable heat lamp and light extension assembly comprises:

a) two equal-sized cylinders, each cylinder comprising two ends;

b) two equal-sized base flanges, each base flange comprising an open end and a base end, wherein a first base flange base end is affixed to one heat lamp and light end by a plurality of fasteners, and a second base flange base end is affixed to the other heat lamp and light end by a plurality of fasteners, and each base flange open end is sized to receive and secure a cylinder end by a set screw; and c) two equal-sized cover flanges, each cover flange comprising a cover flange open end and a cover flange base end, wherein each cover flange base end is sized to receive and lock onto a base flange base end by engaging a set screw extension within a channel inside the cover flange base end, wherein each cover flange open end is sized to receive a the cylinder end secured by the set screw, and wherein the cylinder end not engaged with the base flange and cover flange assembly is sized to be adjustably received in the second heat lamp and light articulating arm second end aperture.

13. An adjustable bracket assembly, comprising in combination:

a) at least two support elements, each support element comprising a plurality of equal sized apertures through external support element side surfaces and internal support element side surfaces, each aperture sized to receive an attachment assembly fitting flush into the internal first support side surface, wherein each attachment assembly fitting comprises a centered recess sized to receive a press fitted corresponding pivot hinge assembly end;

b) a longitudinally disposed panel comprising two ends, each panel end comprising an adjustable panel attachment assembly communicating with a pivot hinge assembly end extending from a first articulating arm end of a articulating arm assembly and wherein a second articulating arm of the articulating arm assembly end comprises an aperture sized to receive an opposite pivot hinge assembly end press fitted into the attachment assembly fitting of corresponding support element side internal surface apertures of the at least two support elements, whereby the panel is adjustable about a longitudinal axis defined by the pivot hinge assemblies communicating with the panel ends; and c) an attachment assembly to secure a base surface of the at least two support elements to a horizontally disposed planar surface.

14. The adjustable bracket assembly of claim 13, further comprising a fixed panel secured to a top surface of each of the at least two support elements.

15. The adjustable bracket assembly of claim 14, further comprising reversible fixed panels secured to an external side surface of each of the at least two support elements.

16. The adjustable bracket assembly of claim 13, further comprising a modular light bar comprising two ends, each light bar end comprising an adjustable light bar attachment assembly communicating with a light bar assembly fitting of corresponding support element side internal surface apertures of the at least two support elements, whereby the light bar is adjustable about a light bar longitudinal axis to provide light upon the horizontally disposed planar surface.

17. The adjustable bracket assembly of claim 13, further comprising a modular heat lamp and light comprising two ends, each heat lamp and light end comprising an adjustable heat lamp and light attachment assembly communicating with an heat lamp and light assembly fitting of corresponding support element side internal surface apertures of the at least two support elements, whereby the heat lamp and light is adjustable about a heat lamp and light longitudinal axis to provide heat to the horizontally disposed planar surface.

18. The adjustable bracket assembly of claim 17, wherein the adjustable heat lamp and light attachment assembly comprises:
   a) a heat lamp and light extension assembly on each heat lamp and light end;
   b) at least two articulating arms, each articulating arm comprising two ends, with apertures on each arm end, one arm end aperture sized to rotatably receive and hold a heat lamp and light extension assembly; and
   c) a plurality of pivot hinges, each pivot hinge comprising two ends wherein each pivot hinge end is sized to be press fitted into the at least two articulating arm end apertures or the heat lamp and light assembly fitting whereby the at least two articulating arms are disposed between the least two support elements, defining two separate longitudinal axes through corresponding pivot hinges for optimal orientation of the heat lamp and light to direct heat onto the horizontally disposed planar surface.

19. An adjustable bracket assembly comprising, in combination:
   a) a pair of equally sized, vertically disposed support posts, each support post comprising a front side surface, a back side surface, a top side surface, a bottom side surface, and two side surfaces comprising an internal side surface with respect to the paired posts and an external side surface with respect to the paired posts, a plurality of equal sized and spaced apertures through the post side surfaces, and an attachment assembly attaching each post bottom side surface to a common horizontally disposed planar surface so that the support post respective front and back side surfaces are correspondingly configured one to the other, and whereby each of the plurality of apertures in one support post is horizontally aligned with a corresponding aperture of the other support post;
   b) at least one first articulating arm assembly comprising a pivot hinge articulating arm comprising two ends, with a first articulating arm assembly first end adjustably attached by a pivot hinge assembly to an aperture fitting attached to a corresponding aperture on each support post internal side, and a first articulating arm assembly second end adjustably attached by a pivot hinge assembly to an adjustable panel assembly attached to a tempered, polished glass panel end, whereby the glass panel is adjustably positioned along a variable horizontally disposed, longitudinal axis between the support posts;
   c) two equal sized clear side panels, each side panel fixedly attached by an attachment assembly to a support post external side surface, whereby the side panels can be detached, reversed, and reattached to the post external side surfaces to provide alternative utilities; and
   d) a clear top panel fixedly attached by an attachment assembly to each support post top surface to provide a fixed, horizontal panel between the support posts.

20. An adjustable bracket assembly comprising, in combination:
   a) a pair of equally sized, vertically disposed support posts, each support post comprising a front side surface, a back side surface, a top side surface, a bottom side surface, and two side surfaces comprising an internal side surface with respect to the paired posts and an external side surface with respect to the paired posts, a plurality of equal sized and spaced apertures through the post side surfaces, and an attachment assembly attaching each post bottom side surface to a common horizontally disposed planar surface so that the support post respective front and back side surfaces are correspondingly configured one to the other, and whereby each of the plurality of apertures in one support post is horizontally aligned with a corresponding aperture of the other support post;
   b) at least one first articulating arm assembly comprising a pivot hinge articulating arm comprising two ends, with a first articulating arm assembly first end adjustably attached by a pivot hinge assembly to an aperture fitting attached to a corresponding aperture on each support post internal side, and a first articulating arm assembly second end adjustably attached by a pivot hinge assembly to an adjustable panel assembly attached to a tempered glass panel, whereby the glass panel is adjustably positioned between along a variable horizontally disposed, longitudinal axis between the support posts;
   c) a clear top panel fixedly attached by an attachment assembly to each support post top surface to provide a fixed, horizontal panel between the support posts;
   d) at least one modular light bar comprising two ends, each light bar end comprising an adjustable attachment fitting attached to a corresponding aperture on each support post internal side whereby the light panel is adjustably positioned between the support posts to provide light to a desired portion common horizontal disposed surface below the adjustable bracket assembly; and
   e) at least one second articulated arm assembly comprising two articulating arms, each articulating arm comprising two ends, wherein a second articulated arm assembly first arm first end is adjustably attached to a heat lamp and light extension assembly connected to an end of a modular heat lamp and light, and a second articulated arm assembly first arm second end is adjustably attached by a pivot hinge assembly to a second articulated arm assembly second arm first end, and a second articulated arm assembly second arm second end is adjustably attached by a pivot hinge assembly to an aperture fitting attached to a corresponding aperture on each support post internal side, whereby the heat lamp and light is adjustably positioned between the support posts to provide heat to a desired portion of the common horizontally disposed planar surface below the adjustable bracket assembly.

21. An adjustable bracket assembly comprising, in combination:
   a) a pair of equally sized, vertically disposed support posts, each support post comprising a front side surface, a back side surface, a top side surface, a bottom side surface, and two side surfaces comprising an internal side surface with respect to the paired posts and an external side surface with respect to the paired posts, a plurality of equal sized and spaced apertures through the post side surfaces, and an attachment assembly attaching each post bottom side surface to a common horizontally disposed planar surface so that the support post respective front and back side surfaces are correspondingly configured one to the other, and whereby each of the plurality of apertures in one support post is horizontally aligned with a corresponding aperture of the other support post;

b) at least one first articulating arm assembly comprising a pivot hinge articulating arm comprising two ends, with a first articulating arm assembly first end adjustably attached by a pivot hinge assembly to an aperture fitting attached to a corresponding aperture on each support post internal side, and a first articulating arm assembly second end adjustably attached by a pivot hinge assembly to an adjustable panel assembly attached to a tempered, polished glass panel end, whereby the glass panel is adjustably positioned along a variable horizontally disposed, longitudinal axis between the support posts;

c) two equal sized clear side panels, each side panel fixedly attached by an attachment assembly to a support post external side surface, whereby the side panels can be detached, reversed, and reattached to the post external side surfaces to provide alternative utilities;

d) a clear top panel fixedly attached by an attachment assembly to each support post top surface to provide a fixed, horizontal panel between the support posts;

e) at least one modular light bar comprising two ends, each light bar end comprising an adjustable attachment fitting attached to a corresponding aperture on each support post internal side whereby the light panel is adjustably positioned between the support posts to provide light to a desired portion of the common horizontally disposed planar surface below the adjustable bracket assembly; and f) at least one second articulated arm assembly comprising two articulating arms, each articulating arm comprising two ends, wherein a second articulated arm assembly first arm first end is adjustably attached to a heat lamp and light extension assembly connected to an end of a modular heat lamp and light, and a second articulated arm assembly first arm second end is adjustably attached by a pivot hinge assembly to a second articulated arm assembly second arm first end, and a second articulated arm assembly second arm second end is adjustably attached by a pivot hinge assembly to an aperture fitting attached to a corresponding aperture on each support post internal side, whereby the heat lamp and light is adjustably positioned between the support posts to provide heat to a desired portion of the common horizontally disposed planar surface below the adjustable bracket assembly.

22. An adjustable bracket assembly comprising, in combination:

a) a pair of equally sized, vertically disposed support posts, each support post comprising a front side surface, a back side surface, a top side surface, a bottom side surface, and two side surfaces comprising an internal side surface with respect to the paired posts and an external side surface with respect to the paired posts, a plurality of equal sized and spaced apertures through the post side surfaces, and an attachment assembly attaching each post bottom side surface to a common horizontally disposed planar surface so that the support post respective front and back side surfaces are correspondingly configured one to the other, and whereby each of the plurality of apertures in one support post is horizontally aligned with a corresponding aperture of the other support post; and b) at least one first articulating arm assembly comprising a pivot hinge articulating arm comprising two ends, with a first articulating arm assembly first end adjustably attached by a pivot hinge assembly to an aperture fitting attached to a corresponding aperture on each support post internal side, and a first articulating arm assembly second end adjustably attached by a pivot hinge assembly to an adjustable panel assembly attached to a tempered, polished glass panel end, whereby the glass panel is adjustably positioned along a variable horizontally disposed, longitudinal axis between the support posts.

23. An adjustable bracket assembly comprising, in combination:

a) a pair of equally sized, vertically disposed support posts, each support post comprising a front side surface, a back side surface, a top side surface, a bottom side surface, and two side surfaces comprising an internal side surface with respect to the paired posts and an external side surface with respect to the paired posts, a plurality of equal sized and spaced apertures through the post side surfaces, and an attachment assembly attaching each post bottom side surface to a common horizontally disposed planar surface so that the support post respective front and back side surfaces are correspondingly configured one to the other, and whereby each of the plurality of apertures in one support post is horizontally aligned with a corresponding aperture of the other support post; and b) at least one articulated arm assembly comprising two articulating arms, each articulating arm comprising two ends, wherein an articulated arm assembly first arm first end is adjustably attached to a heat lamp and light extension assembly connected to an end of a modular heat lamp and light, and an articulated arm assembly first arm second end is adjustably attached by a pivot hinge assembly to an articulated arm assembly second arm first end, and an articulated arm assembly second arm second end is adjustably attached* by a pivot hinge assembly to an aperture fitting attached to a corresponding aperture on each support post internal side, whereby the heat lamp and light is adjustably positioned between the support posts to provide heat to a desired portion of the common horizontally disposed planar surface below the adjustable bracket assembly.

* * * * *